United States Patent
Lee et al.

(10) Patent No.: US 10,004,043 B2
(45) Date of Patent: Jun. 19, 2018

(54) METHOD FOR CONTROLLING ELECTRIC POWER IN WIRELESS COMMUNICATION SYSTEM SUPPORTING CHANGE IN PURPOSE OF WIRELESS RESOURCE AND APPARATUS THEREFOR

(71) Applicant: LG ELECTRONICS INC., Seoul (KR)

(72) Inventors: Seungmin Lee, Seoul (KR); Hakseong Kim, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 20 days.

(21) Appl. No.: 14/895,149

(22) PCT Filed: Jun. 18, 2014

(86) PCT No.: PCT/KR2014/005357
§ 371 (c)(1),
(2) Date: Dec. 1, 2015

(87) PCT Pub. No.: WO2014/204203
PCT Pub. Date: Dec. 24, 2014

(65) Prior Publication Data
US 2016/0135128 A1    May 12, 2016

Related U.S. Application Data

(60) Provisional application No. 61/836,658, filed on Jun. 18, 2013.

(51) Int. Cl.
*H04W 52/10* (2009.01)
*H04W 72/04* (2009.01)
(Continued)

(52) U.S. Cl.
CPC ........... *H04W 52/10* (2013.01); *H04W 52/08* (2013.01); *H04W 52/146* (2013.01); *H04W 72/0413* (2013.01); *H04W 52/28* (2013.01)

(58) Field of Classification Search
CPC ...................................................... H04W 52/10
See application file for complete search history.

(56) References Cited

U.S. PATENT DOCUMENTS

2009/0180433 A1   7/2009  Ahn et al.
2011/0038271 A1 * 2/2011  Shin .................... H04W 52/146
                                                      370/252
(Continued)

FOREIGN PATENT DOCUMENTS

CN   102076072 A   5/2011
CN   102308640 A   1/2012
(Continued)

OTHER PUBLICATIONS

Anritsu, "Relative Power Difference Between Uplink CCs," 3GPP TSG-RAN4 Meeting #66bis, Tdoc R4-131270, Chicago, USA, Apr. 15-19, 2013, pp. 1-4.

*Primary Examiner* — John Blanton
(74) *Attorney, Agent, or Firm* — Birch, Stewart, Kolasch & Birch, LLP

(57) ABSTRACT

The present invention proposes a method for controlling electric power of a user equipment in a wireless communication system supporting change in use of a radio resource, and an apparatus therefor. Specifically, the method comprises a step of receiving, from a base station, a transmission power control (TPC) command for a first radio resource set and a second radio resource set, wherein the first radio resource set is configured to dynamic changes of a use of radio resources in the first radio resource set, the second radio resource set is configured to prevent dynamic changes of a use of wireless resources in the second radio resource (Continued)

set, and different open-loop control parameters are applied to the first radio resource set and the second radio resource set and the same closed-loop control parameters are applied to the first radio resource set and the second radio resource set.

12 Claims, 9 Drawing Sheets

(51) Int. Cl.
*H04W 52/08* (2009.01)
*H04W 52/14* (2009.01)
*H04W 52/28* (2009.01)

(56) References Cited

U.S. PATENT DOCUMENTS

| | | | |
|---|---|---|---|
| 2012/0322496 A1 | 12/2012 | Shin et al. | |
| 2013/0040690 A1* | 2/2013 | Lee | H04W 52/146 455/522 |
| 2013/0114562 A1 | 5/2013 | Seo et al. | |
| 2014/0293900 A1* | 10/2014 | Takeda | H04L 5/0073 370/329 |
| 2015/0111609 A1* | 4/2015 | Koutsimanis | H04W 52/143 455/522 |
| 2016/0066288 A1* | 3/2016 | Feng | H04W 52/54 370/280 |

FOREIGN PATENT DOCUMENTS

| | | |
|---|---|---|
| CN | 102474824 A | 5/2012 |
| CN | 102934498 A | 2/2013 |
| KR | 10-2009-0076745 A | 7/2009 |

\* cited by examiner

FIG. 2
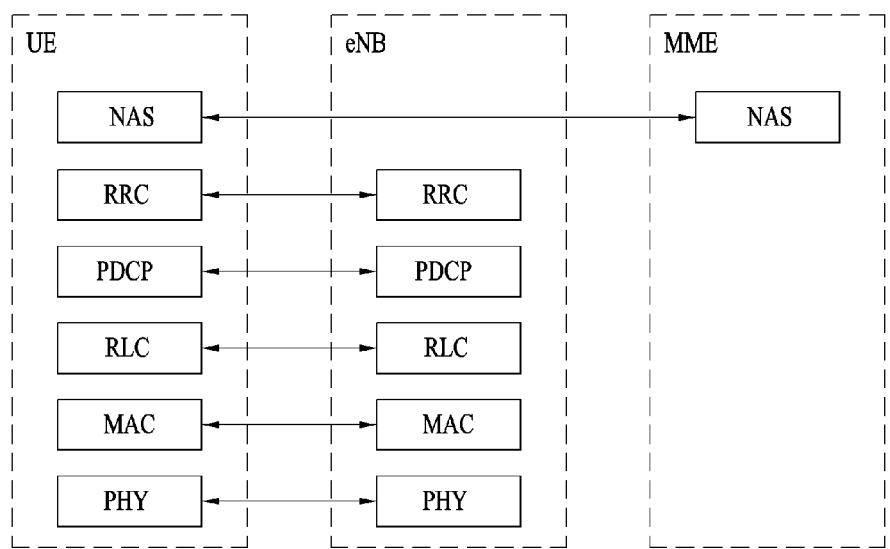
(a) Control-Plane Protocol Stack
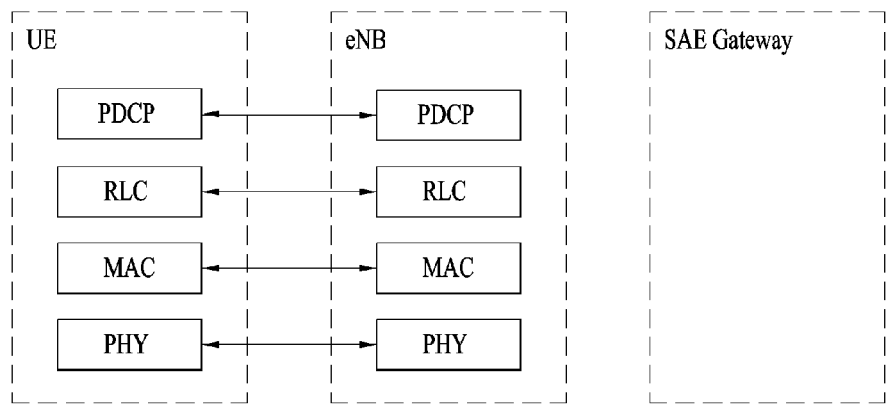
(b) User-Plane Protocol Stack

METHOD FOR CONTROLLING ELECTRIC POWER IN WIRELESS COMMUNICATION SYSTEM SUPPORTING CHANGE IN PURPOSE OF WIRELESS RESOURCE AND APPARATUS THEREFOR

CROSS REFERENCE TO RELATED APPLICATIONS

This application is the National Phase of PCT International Application No. PCT/KR2014/005357, filed on Jun. 18, 2014, which claims priority under 35 U.S.C. 119(e) to U.S. Provisional Application No. 61/836,658, filed on Jun. 18, 2013, all of which are hereby expressly incorporated by reference into the present application.

FIELD OF THE INVENTION

The present invention relates to a wireless communication system and, most particularly, to a method for controlling transmission power in a wireless communication system supporting a change of a use of radio resources and an apparatus therefor.

BACKGROUND ART

A brief description is now given of a $3^{rd}$ Generation Partnership Project Long Term Evolution (3GPP LTE or, simply, LTE) communication system as an example of a wireless communication system to which the present invention is applicable.

FIG. 1 illustrates a schematic network structure of an evolved universal mobile telecommunication system (E-UMTS). An E-UMTS system is an evolved version of the UMTS system and basic standardization thereof is in progress under the 3rd Generation Partnership Project (3GPP). The E-UMTS is also referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS includes a User Equipment (UE), base stations (or eNBs or eNode Bs), and an Access Gateway (AG) which is located at an end of a network (E-UTRAN) and which is connected to an external network. Generally, an eNB can simultaneously transmit multiple data streams for a broadcast service, a multicast service and/or a unicast service.

One or more cells may exist for one BS. The cell provides a downlink or uplink transmission service to several UEs using any one of bandwidths of 1.25, 2.5, 5, 10, 15 and 20 MHz. Different cells may be set to provide different bandwidths. A BS controls data transmission or reception to or from a plurality of UEs. The BS transmits downlink scheduling information to a UE with respect to downlink (DL) data so as to inform the UE of time/frequency domain, coding, data size, Hybrid Automatic Repeat and reQuest (HARQ) associated information of data to be transmitted, or the like. The BS transmits uplink scheduling information to a UE with respect to uplink (UL) data so as to inform the UE of time/frequency domain, coding, data size, HARQ associated information used by the UE, or the like. An interface for transmitting user traffic or control traffic can be used between BSs. A Core Network (CN) may include the AG, a network node for user registration of the UE, or the like. The AG manages mobility of a UE on a Tracking Area (TA) basis. One TA includes a plurality of cells.

Wireless communication technology has been developed to reach the LTE based on Wideband Code Division Multiple Access (WCDMA), but demands and expectations of users and providers have continuously increased. In addition, since other aspects of wireless access technology continue to evolve, new advances are required to remain competitive in the future. There is a need for reduction in cost per bit, service availability increase, the use of a flexible frequency band, a simple structure and an open type interface, appropriate power consumption of a UE, etc.

In order to support (or assist on) an efficient management and operation of the wireless communication system of the base station, the user equipment periodically and/or aperiodically reports status information of the current channel to the base station. Since the status information of the channel that is being reported as described above may include results, which are calculated based upon diverse situations, a more efficient reporting method is required.

DETAILED DESCRIPTION OF THE INVENTION

Technical Objects

Based upon the above-described discussion, a method for controlling transmission power in a wireless communication system supporting a change of a use of radio resources and an apparatus therefor will hereinafter be proposed.

It will be appreciated by persons skilled in the art that the objects that could be achieved with the present invention are not limited to what have been particularly described hereinabove and the above and other objects that the present invention could achieve will be more clearly understood from the following detailed description.

Technical Solutions

As an aspect of the present invention for resolving the above-described problem, a method for controlling transmission power of a terminal (or user equipment) in a wireless communication system supporting a change of a use of radio resources includes a step of receiving, from a base station, a transmission power control (TPC) command for a first radio resource set and a second radio resource set, wherein the first radio resource set may be configured to allow dynamic changes of a use of radio resources in the first radio resource set, wherein the second radio resource set may be configured to prevent dynamic changes of a use of radio resources in the second radio resource set, and wherein different open-loop control parameters are applied to the first radio resource set and the second radio resource set and the same closed-loop control parameters are applied to the first radio resource set and the second radio resource set.

Additionally, the transmission power control command may be corresponding to a positive value and may be configured to be not applied to a radio resource set, among the first radio resource set and the second radio resource set, when a uplink data channel (PUSCH) transmission power of the radio resource set is not reached to a maximum user equipment transmission power.

Additionally, the transmission power control command may be corresponding to a positive value and may be configured to be not applied to both of the first radio resource set and the second radio resource set, when a uplink data channel (PUSCH) transmission power of at least one of the first radio resource set and the second radio resource set is not reached to a maximum user equipment transmission power.

Additionally, the transmission power control command may be corresponding to a positive value and may be configured to be not applied to both of the first radio resource set and the second radio resource set, when uplink data channel (PUSCH) transmission powers of both of the first radio resource set and the second radio resource set are not reached to a maximum user equipment transmission power.

Additionally, the transmission power control command may be corresponding to a positive value and may be configured to be applied to both of the first radio resource set and the second radio resource set, when uplink data channel (PUSCH) transmission powers of both of the first radio resource set and the second radio resource set are reached to a maximum user equipment transmission power.

Additionally, the transmission power control command may be corresponding to a positive value and may be configured to be applied only when a uplink data channel (PUSCH) transmission power of a pre-designated representative radio resource set among the first radio resource set and the second radio resource set is reached to a maximum user equipment transmission power.

Additionally, the transmission power control command may be corresponding to a negative value and may be configured to be not applied to a radio resource set, among the first radio resource set and the second radio resource set, when a uplink data channel (PUSCH) transmission power of the radio resource set is reached to a minimum user equipment transmission power.

Additionally, the transmission power control command may be corresponding to a negative value and may be configured to be not applied to both of the first radio resource set and the second radio resource set, when a uplink data channel (PUSCH) transmission power of at least one of the first radio resource set and the second radio resource set is reached to a minimum user equipment transmission power.

Additionally, the transmission power control command may be corresponding to a negative value and may be configured to be applied to the first radio resource set and the second radio resource set, only when uplink data channel (PUSCH) transmission powers of both of the first radio resource set and the second radio resource set are not reached to a minimum user equipment transmission power.

Additionally, the transmission power control command may be corresponding to a negative value and may be configured to be not applied to both of the first radio resource set and the second radio resource set only when uplink data channel (PUSCH) transmission powers of both of the first radio resource set and the second radio resource set are reached to a minimum user equipment transmission power.

Furthermore, the transmission power control command may be corresponding to a negative value and may be configured to be not applied only when a uplink data channel (PUSCH) transmission power of a pre-designated representative radio resource set among the first radio resource set and the second radio resource set is reached to a minimum user equipment transmission power.

As another aspect of the present invention for resolving the above-described problem, a user equipment performing transmission power control in a wireless communication system supporting a change a use of radio resources includes a Radio Frequency Unit; and a processor, wherein the processor may be configured to receive, from a base station, a transmission power control (TPC) command for a first radio resource set and a second radio resource set, wherein the first radio resource set is configured to allow dynamic changes of a use of radio resources in the first wireless set, wherein the second radio resource set is configured to prevent dynamic changes of a use of radio resource set in the second radio resource set, and wherein different open-loop control parameters are applied to the first radio resource set and the second radio resource set and the same closed-loop control parameters are applied to the first radio resource set and the second radio resource set.

Advantageous Effects

According to the exemplary embodiment of the present invention, a method for controlling transmission power control may be efficiently performed in a wireless communication system supporting a change of a use of radio resources.

The effects that can be obtained from the present invention are not limited to the aforementioned effects, and other effects may be clearly understood by those skilled in the art from the descriptions given below.

BRIEF DESCRIPTION OF THE DRAWINGS

The accompanying drawings, which are included to provide a further understanding of the invention, illustrate embodiments of the invention and together with the description serve to explain the principle of the invention.

FIG. 2 is a diagram showing the structure of a control plane and a user plane of a radio interface protocol between a User Equipment (UE) and an E-UTRAN based on the 3GPP radio access network standard.

BEST MODE FOR CARRYING OUT THE PRESENT INVENTION

Figure 1:
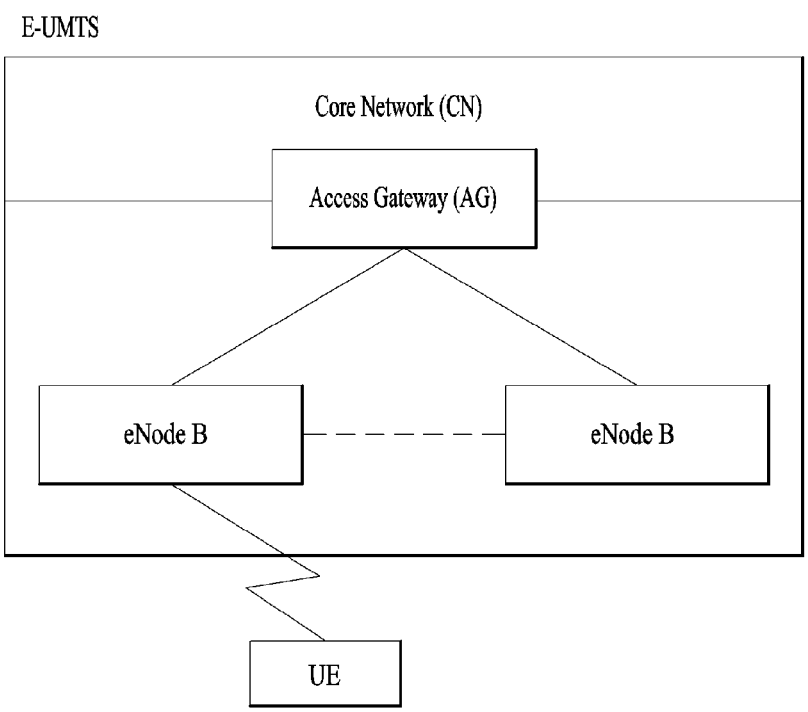
FIG. 1 is a schematic diagram showing a network architecture of an Evolved Universal Mobile Telecommunications System (E-UMTS) as an example of a mobile communication system.

The technology described below may be used in a wide range of wireless access systems, such as CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and so on. Herein, the CDMA may be realized by a radio technology such as UTRA (Universal Terrestrial Radio Access) or CDMA2000. The TDMA may be realized by a radio technology such as GSM (Global System for Mobile communications)/GPRS (General Packet Radio Service)/EDGE (Enhanced Data Rates for GSM Evolution). The OFDMA may be realized by a radio technology such as IEEE 802.11 (Wi-Fi), IEEE 802.16 (WiMAX), IEEE 802-20, E-UTRA (Evolved UTRA), and so on. The UTRA corresponds to a portion of the UMTS (Universal Mobile Telecommunications System). And, as a portion of the E-UMTS (Evolved UMTS) using the E-UTRA, the 3GPP (3rd Generation Partnership Project) LTE (long term evolution) system adopts the OFDMA in a downlink and adopts the SC-FDMA in an uplink. The LTE-A (LTE-Advanced) corresponds to an evolution of the 3GPP LTE system.

For the clarity in the description of the present invention, the present invention will be described based upon the 3GPP LTE/LTE-A systems. Additionally, the specific terms used in the following description of the present invention are provided to facilitate the understanding of the present invention. And, therefore, without deviating from the technical scope and spirit of the present invention, such specific terms may also be varied and/or replaced by other terms.

FIG. 2 is a diagram showing the structure of a control plane and a user plane of a radio interface protocol between a UE and an E-UTRAN based on the 3GPP radio access network standard. The control plane refers to a path through which control messages used for managing a call by the UE and the E-UTRAN are transmitted. The user plane refers to a path through which data generated at an application layer, for example, voice data, Internet packet data or the like is transmitted.

The physical layer, which is the first layer, provides an information transfer service to a higher layer using a physical channel. The physical layer is connected with a medium access control (MAC) layer located at a higher level through a transport channel, and data is transferred between the MAC layer and the physical layer via the transport channel. Data is transferred between physical layers of a transmission side and a reception side via the physical channel. The physical channel uses time and frequency as radio resources. In detail, the physical channel is modulated using an Orthogonal Frequency Division Multiple Access (OFDMA) scheme in downlink and is modulated using a Single Carrier Frequency Division Multiple Access (SC-FDMA) scheme in uplink.

The MAC layer of the second layer provides services to a radio link control (RLC) layer, which is a higher layer, via a logical channel. The RLC layer of the second layer enables reliable data transmission. The function of the RLC layer is included as the functional block of the MAC layer. A Packet Data Convergence Protocol (PDCP) layer of the second layer performs a header compression function that reduces the size of an Internet protocol (IP) packet header containing unnecessary control information having a relatively large size in order to efficiently transmit the IP packets such as IPv4 or IPv6 packets over a radio interface having a limited bandwidth.

A Radio Resource Control (RRC) located at a lowest portion of the third layer is defined only in the control plane. The RRC layer handles logical channels, transport channels and physical channels for the configuration, re-configuration and release of Radio Bearers (RBs). Here, the RBs refer to services provided by the second layer, for data transfer between the UE and the network. The RRC layers of the UE and the network exchange RRC messages with each other. If the RRC layers of the UE and the network are RRC-connected, the UE is in an RRC connected mode and, if so not, is in an RRC idle mode. A Non-Access Stratum (NAS) layer located at a layer higher than the RRC layer performs a function such as session management and mobility management.

One cell configuring a base station (eNB) provides a downlink or uplink transmission service to several UEs using any one of bandwidths of 1.4, 3, 5, 10, 15 and 20 MHz. Different cells may be set to provide different bandwidths.

Examples of a downlink transport channel for transmitting data from the network to the UE include a Broadcast Channel (BCH) for transmitting system information, a Paging Channel (PCH) for transmitting a paging message, or a downlink Shared Channel (SCH) for transmitting user traffic or a control message. Traffic or a control message of a broadcast service or downlink multicast may be transmitted through the downlink SCH or a separate downlink Multicast Channel (MCH). Examples of an uplink transport channel for transmitting data from the UE to the network include a Random Access Channel (RACH) for transmitting an initial control message and an uplink SCH for transmitting user traffic or a control message. Examples of a logical channel located at a layer above the transport channel and mapped to the transport channel includes a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
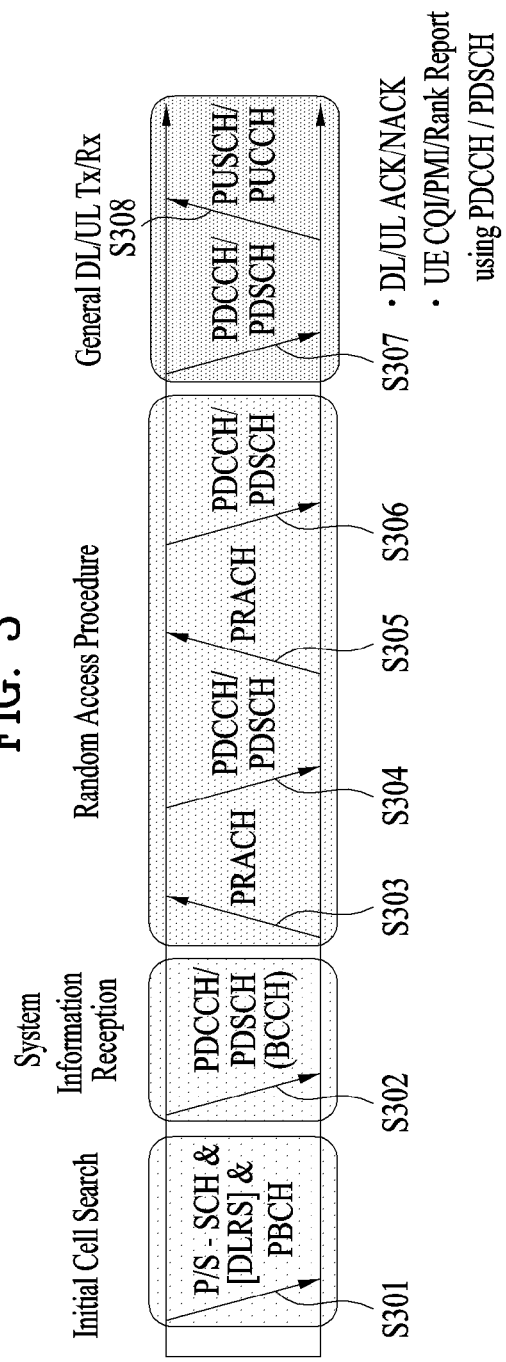
FIG. 3 is a diagram illustrating physical channels used in a 3GPP system and a general signal transmitting method using the same.

FIG. 3 is a diagram illustrating physical channels used in a 3GPP system and a general signal transmitting method using the same.

If a UE is powered on or newly enters a cell, the UE performs an initial cell search operation such as synchronization with a base station (S301). The UE receives a primary synchronization channel (P-SCH) and a secondary synchronization channel (S-SCH) from the base station so as to synchronize with the base station and to acquire information such as a cell ID. Thereafter, the UE may receive a physical broadcast channel from the base station so as to acquire a broadcast signal in the cell. The UE may receive a downlink reference signal (DL RS) so as to check a downlink channel state in the initial cell search step.

The UE, upon completion of initial cell search, may receive a Physical Downlink Control Channel (PDCCH) and a Physical Downlink Shared Channel (PDSCH) according to information carried in the PDCCH so as to acquire more detailed system information (S302).

When the UE initially accesses the base station or when radio resources for signal transmission are not present, the UE may perform a Random Access Procedure (RACH) with respect to the base station (steps S303 to S306). The UE may transmit a specific sequence using a preamble through a Physical Random Access Channel (PRACH) (S303 and S305) and receive a response message of the preamble through the PDCCH and the PDSCH corresponding thereto (S304 and S306). In the contention-based RACH, a contention resolution procedure may be additionally performed.

After performing the above-described procedures, the user equipment may receive a Physical Downlink Control Channel (PDCCH)/Physical Downlink Shared Channel (PDSCH) (S307), as a general uplink/downlink signal transmission procedure, and may then perform Physical Uplink Shared Channel (PUSCH)/Physical Uplink Control Channel (PUCCH) transmission (S308). The control information being transmitted by the user equipment to the base station is collectively referred to as Uplink Control Information (UCI). The UCI includes HARQ ACK/NACK (Hybrid Automatic Repeat and reQuest Acknowledgement/Negative-ACK), SR (Scheduling Request), CSI (Channel State Information), and so on. In the description of the present invention, the HARQ ACK/NACK will simply be referred to as HARQ-ACK or ACK/NACK (A/N). Herein, the HARQ-ACK includes at least one of a positive ACK (simply referred to as ACK), a negative ACK (simply referred to as NACK), a DTX, and an NACK/DTX. The CSI includes CQI (Channel Quality Indicator), PMI (Precoding Matrix Indicator), RI (Rank Indication), and so on. The UCI is generally transmitted through the PUCCH. However, when control information and traffic data are to be transmitted at the same time, the UCI may also be transmitted through the PUSCH. Additionally, based upon a network request/indication, the UCI may be aperiodically transmitted through the PUSCH.

Figure 4:
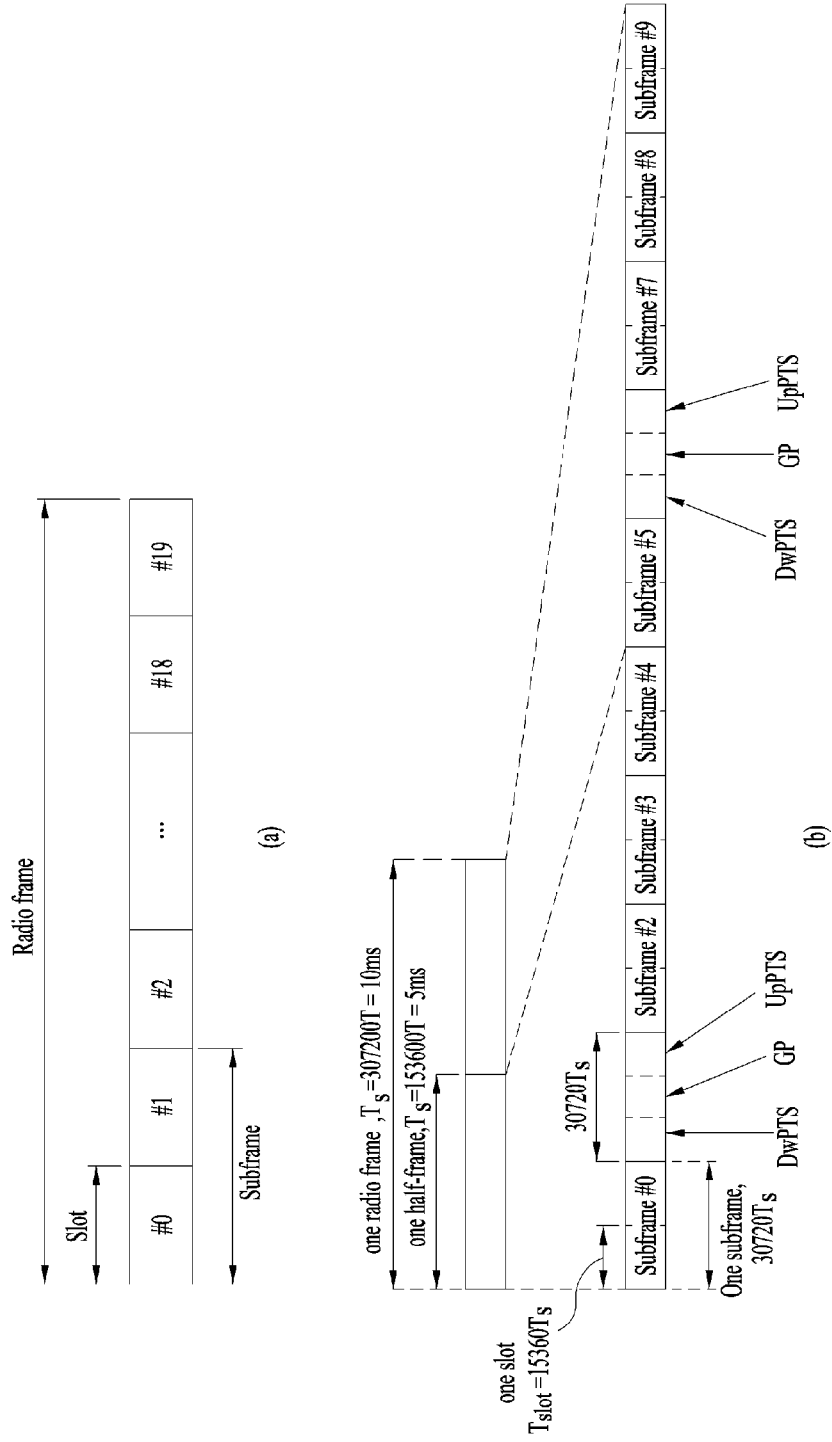
FIG. 4 illustrates exemplary radio frame structures in a LTE system.

FIG. 4 illustrates exemplary radio frame structures in a LTE system.

Referring to FIG. 4, in a cellular OFDM wireless packet communication system, an uplink/downlink data packet is transmitted on a subframe basis and one subframe is defined as a predetermined time interval including a plurality of OFDM symbols. 3GPP LTE standard supports a type-1 radio frame structure applicable to frequency division duplex (FDD) and a type-2 radio frame structure applicable to time division duplex (TDD).

FIG. 4(a) illustrates the type-1 radio frame structure. A downlink radio frame is divided into 10 subframes. Each subframe is further divided into two slots in the time domain. A unit time during which one subframe is transmitted is defined as transmission time interval (TTI). For example, one subframe may be 1 ms in duration and one slot may be 0.5 ms in duration. A slot may include a plurality of orthogonal frequency division multiplexing (OFDM) symbols in the time domain and includes a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. A Resource Block (RB) is a resource allocation unit including a plurality of contiguous subcarriers in a slot.

The number of OFDM symbols included in one slot depends on cyclic prefix (CP) configuration. CP is divided into an extended CP and a normal CP. For example, when OFDM symbols are configured according to normal CP, the number of OFDM symbols included in one slot may be 7. When the OFDM symbols are configured according to extended CP, the duration of one OFDM symbol increases and thus the number of OFDM symbols included in one slot is smaller than the number of OFDM symbols included in one slot when the OFDM symbols are configured using the normal CR In the extended CP case, the number of OFDM symbols included in one slot may be 6, for example. When a channel status is unstable, for example, when a UE moves at a high speed, the extended CP can be used to reduce inter-symbol interference.

When the normal CP is used, one slot includes 7 OFDM symbols, and thus one subframe includes 14 OFDM symbols. In this case, up to three OFDM symbols at the start of each subframe can be allocated to a physical downlink control channel (PDCCH) and the other three OFDM symbols can be allocated to a physical downlink shared channel (PDSCH).

FIG. 4(b) illustrates the type-2 radio frame structure. The type-2 radio frame includes two half frames each having 5 normal subframes, a downlink pilot time slot (DwPTS), a guard period (GP), and an uplink pilot time slot (UpPTS). Each subframe includes two slots.

The DwPTS is used for initial cell search, synchronization, or channel estimation in a UE, whereas the UpPTS is used for channel estimation in an eNB and uplink transmission synchronization in a UE. The GP is a period between a downlink and an uplink, for eliminating interference with the uplink caused by multi-path delay of a downlink signal.

In the current 3GPP standard document, the configuration of a special subframe is defined as shown below in Table 1. In Table 1, when $T_s=1/(15000\times2048)$, this indicates DwPTS and UpPTS, and the remaining area is set up as the guard period.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | | |
| 5 | $6592 \cdot T_s$ | $4384 \cdot T_s$ | $5120 \cdot T_s$ | $20480 \cdot T_s$ | $4384 \cdot T_s$ | $5120 \cdot T_s$ |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

Meanwhile, in a Type 2 radio frame structure, more specifically, in a TDD system, an uplink/downlink subframe configuration (UL/DL configuration) is as shown below in

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 2, D indicates a downlink subframe, U indicates an uplink subframe, and S represents the special subframe.

Additionally, in Table 2, downlink-uplink switching periodicity in the uplink/downlink subframe configuration of each system.

The above-described structure of the radio frame is merely exemplary. And, therefore, the number of subframes included in the radio frame or the number of slots included in a subframe, and the number of symbols included in one slot may be diversely varied.

Hereinafter, uplink transmission power control will be described in detail.

In a wireless communication system, the user equipment periodically measures a signal strength (Rx Signal Level) and signal quality of the Serving cell to which the corresponding user equipment belongs. Information on the measured signal strength (Rx Signal level) and/or signal quality may be used for diverse purposes, and, most particularly, such information may be used for determining (or deciding) the power (hereinafter referred to as 'uplink transmission power') that is transmitted from the user equipment for an uplink.

Controlling the uplink transmission power is an essential (or basic) element of a wireless communication system. The purpose of controlling the uplink transmission power is to control (or adjust) the size of the reception signal transmitted from the base station to an adequate level. By maintaining the size of the reception signal to an adequate level, unnecessary power consumption in the user equipment may be prevented, and, by adaptively determining the data transmission rate, this will be advantageous in enhancing transmission efficiency.

Generally, the controlling of the uplink transmission power consists of two different elements, the two elements being Open Loop Power Control and Closed Loop Power Control. The former includes a part, wherein signal attenuation of the downlink is measured or estimated, and wherein signal attenuation of the uplink is predicted, thereby compensating for the uplink transmission power, and a part, wherein the uplink transmission power is determined (or decided) based upon the size (or amount) of the radio resource that are allocated to the corresponding user equipment, or based upon the attributes of the data that are being transmitted to the corresponding user equipment. And, the latter corresponds to a part, wherein the uplink transmission power is adjusted (or controlled) by using information included in the Closed Loop Power Control message, which is received from the base station.

$$P(i) = \min\{P_{MAX}, \alpha \times PL + A(i) + f(i)\} [dBm] \quad \text{[Equation 1]}$$

Equation 1 represents a method of determining the transmission power of the uplink in accordance with the above-described method. Herein, P(i) represents the uplink transmission power corresponding to an $i^{th}$ time point, and $P_{MAX}$ represents the maximum transmission power of the user equipment (or maximum UE transmission power). And, PL represents a pathloss estimation value of a downlink signal, and $\alpha$ and A(i) represent parameters, which are given by an higher-layer (or upper layer) signal corresponding to an $i^{th}$ time point, an attribute of the data that are being transmitted, the size of the allocated resource, and so on, and, herein, such parameters correspond to the Open Loop Power Control. Additionally, f(i) represents a power control value corresponding to an $i^{th}$ time point, which is determined by the information included in the Closed Loop Power Control message, which is transmitted from the base station, and this corresponds to a parameter for Closed Loop Power Control. Furthermore, in case f(i) represents PUSCH transmission power for a serving cell c, P(i) corresponds to $P_{PUSCH,c}(i)$, and $P_{MAX}$ may be represented as $P_{CMAX,C}$, $\alpha$ may be represented as $\alpha_c$, PL may be represented as $PL_C$, and F(i) may be represented as $F_c(i)$.

The most significant object (or purpose) of the Open Loop Power Control is to set the size of the transmission signal, i.e., the uplink transmission power to an adequate level by applying an estimated or calculated level of signal attenuation of a downlink, under an assumption that the signal attenuation level of the uplink matches with the signal attenuation level of the downlink. Herein, the size of an adequate transmission signal is determined by parameter A(i).

Additionally, an object of the Closed Loop Power Control, which corresponds to the parameter f(i) of Equation 1, is to compensate for a non-conformity (or inconsistency) in signal attenuation between the uplink and the downlink and to compensate for channel fading, which changes at a time scale that is faster than an average signal attenuation.

More specifically, the Open Loop Power Control parameter corresponds to a factor for controlling power in a form of estimating downlink signal attenuation from the base station of a cell to which the user equipment belongs and compensating for the estimated downlink signal attenuation, wherein, for example, if a distance between a user equipment and a base station to which the corresponding user equipment is connected becomes longer, thereby causing the signal attenuation of the downlink to become larger, the uplink transmission power is controlled by using a method of increasing the transmission power of the uplink. And, the Closed Loop Power Control parameter controls the uplink transmission power by using a method of directly delivering (or transmitting) information (control signal) that is required for allowing the base station to control the uplink transmission power.

Hereinafter, according to the present invention, in case the use of radio resources is dynamically changed in accordance with the system load state of each of multiple cells, a method of efficiently managing the transmission power of an uplink data information/control information channel (of a user equipment) will be proposed.

Hereinafter, for simplicity in the description, the present invention will be described on the basis of a 3GPP LTE system. However, the scope of the system to which the present invention is applied may also be extended to systems other than the 3GPP LTE system. Additionally, the exemplary embodiments of the present invention may also be extendedly applied in a case when resources within a specific cell or a specific Component Carrier (CC) are dynamically changed in accordance with the system load status in an environment where Carrier Aggregation is applied. Furthermore, the exemplary embodiments of the present invention may also be extendedly applied in a case when the use of radio resources is dynamically changed within a TDD system or a FDD system. Hereinafter, for simplicity in the description, a situation will be assumed, wherein each of the cells existing in a TDD system environment dynamically changes the use of the existing radio resources in accordance with the load status of its system.

Due to the dynamic change in the use of the radio resources, the (legacy) radio resources may be classified as two different types of resources. For example, the radio resources may be classified as a group of resources being used for a static (i.e., fixed) use (i.e., Static Resource) and a group of resources having dynamically changed uses (i.e., Flexible Resource).

For example, a group of resources that are being used for the same use as the uplink-downlink configuration within a SIB (System Information Block) may be defined as a static resource set (or group), and a group of resources that are being used for a use that is different from that of the uplink-downlink configuration within a SIB (System Information Block) may be defined as a flexible resource set (or group). As another example, a resource set that is being used for the same use as an uplink-downlink configuration, which is configured at a time point of a previous change in the use (e.g., a method of changing the use based upon a pre-defined (or pre-configured) cycle period for changing the use), may also be defined as a static resource set, and a resource set that is being used for a use different from that of an uplink-downlink configuration, which is configured at a time point of a previous change in the use, may also be defined as a flexible resource set.

As yet another example, a resource set that is being used for the same use as an uplink-downlink configuration of a pre-defined Reference Downlink (DL) HARQ Timeline may be defined as a static resource set, and a resource set that is being used for a use different from that of an uplink-downlink configuration of a pre-defined Reference Downlink (DL) HARQ Timeline may be defined as a flexible resource set, or a resource set that is being used for the same use as an uplink-downlink configuration of a pre-defined Reference Uplink (UL) HARQ Timeline may also be defined as a static resource set, and a resource set that is being used for a use different from that of an uplink-downlink configuration of a pre-defined Reference Uplink (UL) HARQ Timeline may also be defined as a flexible resource set.

Herein, for example, the Reference Downlink/Uplink HARQ Timeline (i.e., a HARQ Timeline that is configured for the purpose of maintaining a stable HARQ timeline regardless of a (re-)change in the uplink-downlink configuration) may be defined as i) a Downlink/Uplink HARQ Timeline corresponding to an uplink-downlink configuration including a union of downlink subframes/intersection of uplink subframes of uplink-downlink configuration candidates that can be reconfigured, ii) or a Downlink/Uplink HARQ Timeline corresponding to an uplink-downlink configuration including an intersection of downlink subframes/union of uplink subframes of uplink-downlink configuration candidates that can be reconfigured, iii) or a Downlink/Uplink HARQ Timeline corresponding to an uplink-downlink configuration including a union of downlink subframes/union of uplink subframes of uplink-downlink configuration candidates that can be reconfigured, iv) or a Downlink/Uplink HARQ Timeline corresponding to an uplink-downlink configuration including an intersection of downlink subframes/intersection of uplink subframes of uplink-downlink configuration candidates that can be reconfigured.

Figure 5:
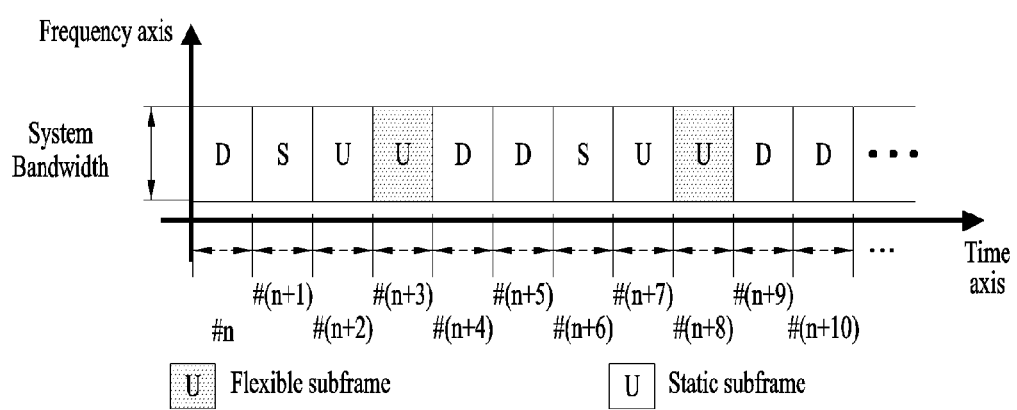
FIG. 5 illustrates an exemplary case wherein (legacy) uplink subframes are divided into a static uplink subframe set and a flexible uplink subframe set in a TDD system environment.

FIG. 5 illustrates an exemplary case wherein (legacy) uplink subframes are divided into a static uplink subframe set and a flexible uplink subframe set in a TDD system environment. Herein, for example, it is assumed that the legacy uplink-downlink configuration, which is configured (or set up) through a SIB (System Information Block) signal, is configured as Uplink-Downlink #1 (i.e., DSUUDDSUUD), and it is also assumed herein that the base station notifies re-configuration information on the use of the radio resources by using a predetermined (or predefined) signal (e.g., a RRC/MAC signal or a SIB signal or a physical control/data channel) to the user equipment.

In FIG. 5, the interference characteristics may be shown differently for each of the different types of uplink subframe sets, and, based upon such characteristics, an independent uplink power control method may be applied for each of the resource types. For example, in a flexible uplink subframe set, since it is highly likely for a neighboring cell to user the corresponding subframes by changing the uplink use of the downlink use, it is highly likely for the Interference Level (or IoT Level) of the flexible uplink subframe set to be relatively greater than that of the static uplink subframe set. More specifically, by configuring (or setting up) the transmission power of the data/control information being transmitted within the flexible uplink subframe set to be greater than a case when the corresponding information is being transmitted through the static uplink subframe set, highly reliable communication may be ensured. More specifically, such operation is advantageous in that uplink communication having similar (or the same) quality can be ensured regardless of the different types of uplink subframe sets.

Additionally, the independent method for controlling uplink power may include i) a method of separating both Open-Loop Control Parameter (e.g., $P_o$ (A semi-static base level), $\alpha$ (An open-loop path-loss compensation component)) and Closed-Loop Control Parameter (e.g., Accumulative TPC command, Absolute TPC command, A component dependent on the MCS) for each of the different uplink resource types and ii) a method of separating only one of the Open-Loop Control Parameter and the Closed-Loop Control Parameter that is predefined.

Prior to describing the present invention in detail, power control of a legacy uplink data channel (PUSCH) (of a user equipment) will hereinafter be described in detail. Details on the above-described uplink transmission power and the power control of a transmission uplink data channel will be provided in detail by referring to 3GPP TS 26.213, which corresponds to a LTE-LTE-A standard (or specification) document. Among the above-described uplink transmission power, in describing the power control of an uplink data channel (PUSCH), the Open-Loop Control Parameter corresponds to $P_{O\_PUSCH,c}(j)$ and $\alpha_c(j)$, and the Closed-Loop Control Parameter corresponds to $f_c(i)$ and $\Delta_{TF,c}(i)$. Herein, j corresponds to a parameter configured to identify a Dynamic Scheduled Grant based PUSCH (re-)transmission method, a Semi-Persistent Scheduling based PUSCH (re-)transmission method, and a Random Access Response Grant based PUSCH (re-)transmission method, and $P_{O\_PUSCH,c}(j)$ corresponds to a parameter respective to $P_{O\_NOMINAL\_PUSCH,c}(j)$, which is a nominal component for PUSCH transmission, and $P_{O\_UE\_PUSCH,c}(j)$, which is a user-specific component. $\alpha_c(j)$ corresponds to a parameter that is being provided through an upper layer (or higher layer), as described above, and also corresponds to a path-loss compensation factor. $f_c(i)$ corresponds to a value indicating a current PSUCH power control adjustment status with respect to subframe index i, and, herein, $f_c(i)$ may be indicated based upon an Accumulative TPC command or an Absolute TPC command. Furthermore, for simplicity in the description, although the present invention is described based upon a parameter that is defined for serving cell c, the interpretation of the present invention shall not be limited only to this.

Furthermore, it is essential to configure $\Delta_{TF,c}(i)$, which is defined in the 3GPP LTE/LTE-A system, as a value respective to one codeword. When $K_S=1.25$ with respect to a specific codeword index, $\Delta_{TF,c}(i)=10 \log_{10}((2^{BPRE \cdot K_s}-1) \cdot \beta_{offset}^{PUSCH})$, and, when $K_S=0$, $\Delta_{TF,c}(i)=0$. Herein, Ks may correspond to a UE-specific parameter deltaMCS-Enabled, which is provided by the base station to the UE via a higher layer (or upper layer) for each codeword. When $K_S=0$, $\Delta_{TF,c}(i)=0$, and the transmission power becomes identical for each codeword. However, when $K_S=1.25$, the transmission power may vary for each codeword in accordance with a transmission information size (or scheduled MCS level), which is normalized by using an allocated resource of each codeword. Herein a Bits Per Resource Element (BPRE) parameter may also be referred to as another term, such as MPR, and so on. More specifically, in case Ks is not equal to 0, $\Delta_{TF,c}(i)$ may be generated based upon an information size per unit resource (e.g., BPRE) for each codeword.

As described above, it is essential to configure $\Delta_{TF,c}(i)$, which is defined in the 3GPP LTE/LTE-A system, as a value respective to one codeword. When $K_S=1.25$ with respect to a specific codeword index, $\Delta_{TF,c}(i)=10 \log_{10}((2^{BPRE \cdot K_s}-1) \cdot \beta_{offset}^{PUSCH}$, and, when $K_S=0$, $\Delta_{TF,c}(i)=0$. Herein, Ks corresponds to a UE-specific parameter deltaMCS-Enabled, which is provided by the base station to the UE via a higher layer (or upper layer) for each codeword.

$BPRE=O_{CQI}/N_{RE}$ with respect to control data that are transmitted through the PUSCH without any UL-SCH(Uplink Shared CHannel) data, and, in other cases, it is equal $$\sum_{r=0}^{C-1} K_r/N_{RE}.$$

Herein, $K_r$ represents a number of code blocks, and C represents a size respective to code block r, and $O_{CQI}$ represents a number of CQI bits including CRC bits, and $N_{RE}$ represents a number of resource elements, which is determined as $N_{RE}=M_{sc}^{PUSCH-initial} \cdot N_{symb}^{PUSCH-initial}$, and, herein, $N_{symb}^{PUSCH-initial}$ represents a number of SC-FDMA symbols carrying the PUSCH in an initial PUSCH transmission subframe.

$\beta_{offset}^{PUSCH}=\beta_{offset}^{CQI}$ with respect to control data that are transmitted through the PUSCH without any UL-SCH(Uplink Shared CHannel) data, and, in other cases, it is equal to 1.

The power control of a legacy uplink data channel may be decided as an Accumulative TPC command or an Absolute TPC command of a closed-loop parameter (i.e., $f_c(i)$) that is received in accordance with the configurations of an "Accumulation-enabled" parameter, which corresponds to a parameter associated with an upper-layer (or higher layer) signal. Herein, when determining a transmission power of an uplink data channel (PUSCH), which is transmitted at a specific subframe time point (i.e., SF #i), if the transmission power of the uplink data channel has (already) reached a maximum UE transmission power value (i.e., $P_{CMAX,c}(i)$) of the user equipment, the transmission power is defined so that accumulation is not performed on closed-loop parameters (i.e., $\delta_{PUSCH,c}(i-K_{PUSCH})$) having positive values or Transmission Power Control Commands (TPC commands), which are previously received, including scheduling information (UL grant) reception time point, which is interconnected with the uplink data channel transmission of the corresponding specific subframe time point (i.e., SF #i).

Additionally, when determining a transmission power of an uplink data channel (PUSCH), which is transmitted at a specific subframe time point (i.e., SF #i), if the transmission power of the uplink data channel has (already) reached a minimum transmission power value of the user equipment (or minimum UE transmission power value), the transmission power is defined so that accumulation (or accumulative calculation (or operation)) is not performed on closed-loop parameters (i.e., $\delta_{PUSCH,c}(i-K_{PUSCH})$) having negative values or Transmission Power Control Commands (TPC commands), which are previously received, including scheduling information (UL grant) reception time point, which is interconnected with the uplink data channel transmission of the corresponding specific subframe time point (i.e., SF #i).

For reference, as shown in 3GPP TS 26.213, in the TDD system, the Dynamic power control of an uplink data channel (PUSCH) is defined to be performed based upon a TPC field of DCI Format 0/4 or DCI Format 3/3A, which is received at (pre-defined) subframe time points in which uplink scheduling information (UL grant) is received.

Based upon the description provided above, the present invention describes a solution for efficiently controlling transmission power of an uplink data information/control information channel of the UE in a case, when only the Open-Loop Control Parameter (e.g., $P_o$ (i.e., A semi-static base level), a (i.e., An open-loop path-loss compensation component)) is independently separated, and when the Closed-Loop Control Parameter (e.g., Accumulative TPC command, Absolute TPC command, A component dependent on the MCS) is commonly applied (i.e., a case when the Closed-Loop Control Parameter is not separated between each of the different types of uplink resources (or each of the different types of uplink subframe sets)), for each of the different types of uplink resources (or for each of the different types of uplink subframe sets). Furthermore, the proposed methods of the present invention may also be extendedly applied to a case when both the Open-Loop Control Parameter and the Closed-Loop Control Parameter are separated for each of the different types of uplink resources (or for each of the different types of uplink subframe sets), or to a case when only a specific parameter is separated, wherein the specific parameter is pre-defined between each of the different types of uplink resources (or each of the different types of uplink subframe sets).

In case only the Open-Loop Control Parameter is independently separated and the Closed-Loop Control Parameter is commonly applied between each of the different types of uplink resources (or each of the different types of uplink subframe sets), if results on whether or not a maximum UE transmission power value (i.e., $P_{CMAX,c}(i)$) of the uplink data channel (PUSCH) transmission power is reached are different from one another for each of the uplink resource types (or uplink subframe sets) at a specific subframe time point (i.e., SF #i), a problem of ambiguity may occur, wherein the ambiguity relates to how to process Closed-loop parameters or transmission power control commands having positive values that are received later on at a time point including the specific subframe time point (i.e., SF #i) or a time point not including the specific subframe time point (i.e., SF #i).

Figure 6:
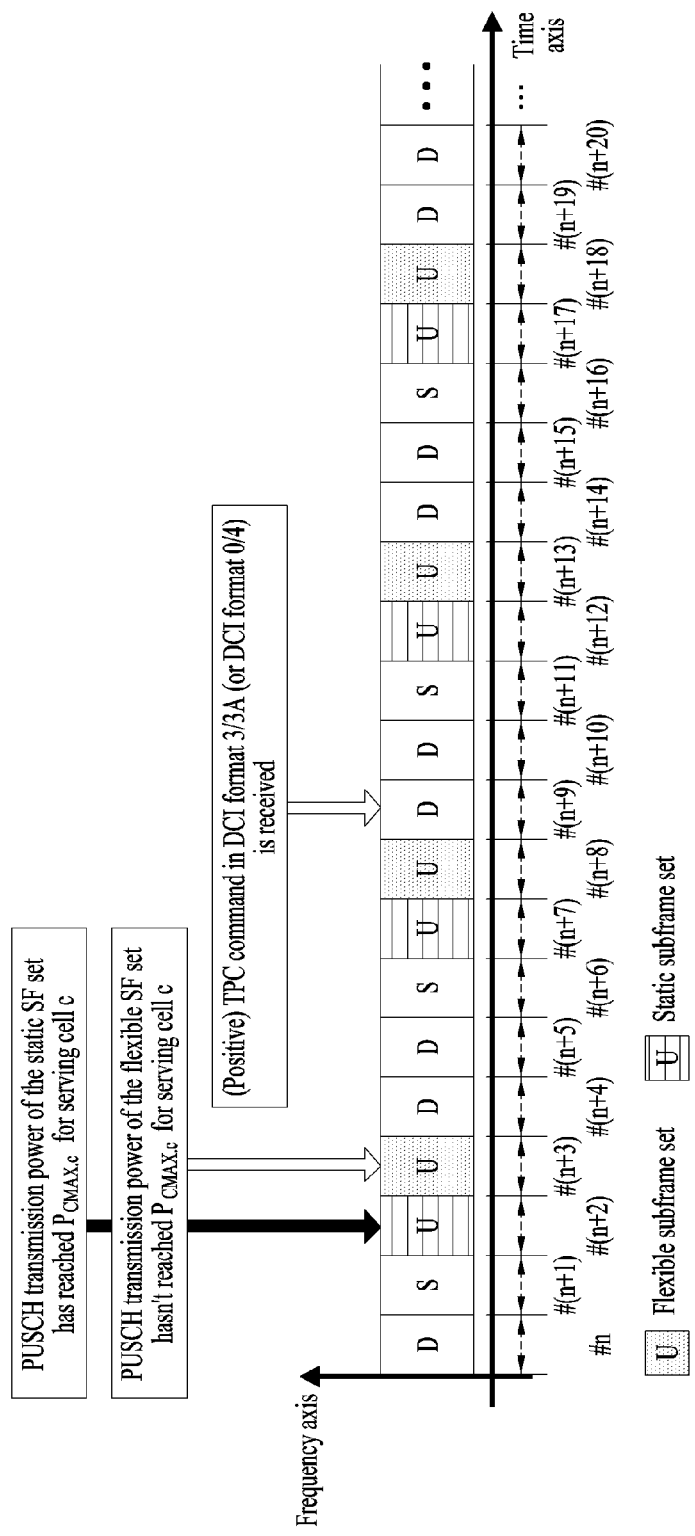
FIG. 6 illustrates a referential view of an example where ambiguity occurs when processing a related art closed-loop parameter given a positive value.

FIG. 6 illustrates an exemplary case wherein ambiguity occurs when processing a related art closed-loop parameter given a positive value. Herein, it is assumed that the Open-Loop Control Parameter between the static subframe set and the flexible subframe set is separated (i.e., $P_{O\_PUSCH,c,Static}SF(j)$, $P_{O\_PUSCH,c,Flexible}SF(j)$ and/or $\alpha_{c,Static}SF(j)$, $\alpha_{c,Flexible}SF(j)$), and that the Closed-Loop Control Parameter (i.e., $f_c(i)$) between the static subframe set and the flexible subframe set is commonly applied.

As shown in FIG. 6, in case of the static subframe set, before a transmission power control command (i.e., SF #(n+9)) is sent down (or received), the transmission power of an uplink data channel (PUSCH) that is associated with the static subframe set has already reached the maximum UE transmission power value (i.e., $P_{CMAX,c}(i)$). Conversely, in case of the flexible subframe set, before a transmission power control command (i.e., SF #(n+9)) is sent down (or received), the transmission power of an uplink data channel (PUSCH) that is associated with the flexible subframe set has not yet reached the maximum UE transmission power value (i.e., $P_{CMAX,c}(i)$). Under these circumstances, a problem may occur in the user equipment that has received the transmission power control command (i.e., SF #(n+9)), wherein it may become unclear (or uncertain) for the user equipment as to how to apply/adopt/accumulate the corresponding power control command for each subframe set.

Accordingly, the present invention proposes diverse exemplary embodiments for resolving the ambiguity related to how to process, for each of the subframe sets, the Closed-loop parameters or transmission power control commands (i.e., $f_c(k)$) having positive values that are received later on at a time point including the specific subframe time point (i.e., SF #i) or a time point not including the specific subframe time point (i.e., SF #i), in case the results on whether or not a maximum UE transmission power value (i.e., $P_{CMAX,c}(i)$) of the uplink data channel (PUSCH) transmission power is reached are different from one another for each of the uplink resource types (or uplink subframe sets) at a specific subframe time point (i.e., SF #i).

First Embodiment

A case, when the results on whether or not a maximum UE transmission power value (i.e., $P_{CMAX,c}(i)$) of the uplink data channel (PUSCH) transmission power is reached are different from one another for each of the uplink resource types (or uplink subframe sets) at a specific subframe time point (i.e., SF #i), will be described according to a first embodiment of the present invention.

Figure 7:
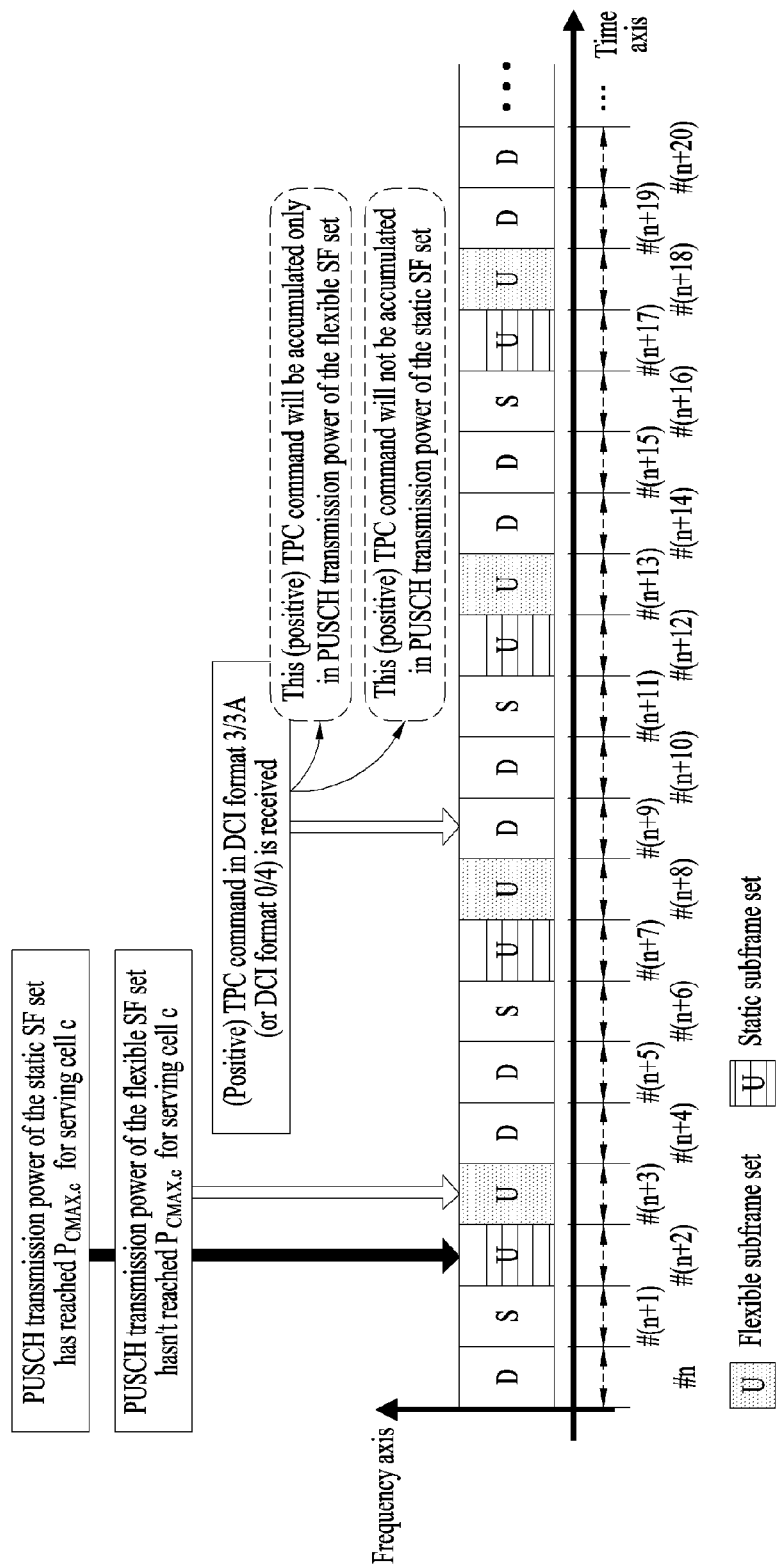
FIG. 7 and FIG. 8 respectively illustrate referential views of exemplary embodiments of the present invention.

FIG. 7 illustrates a referential view of a first embodiment of the present invention. Referring to FIG. 7, in case the Closed-loop parameters or transmission power control commands (i.e., $f_c(k)$) having positive values are received later on at a time point including the specific subframe time point (i.e., SF #i) (or at a time point not including the specific subframe time point (i.e., SF #i)), first of all, settings may be made so that the uplink data channel (PUSCH) transmission power does not accumulate/apply the corresponding Closed-loop parameter or transmission power control command having the positive value with respect to the uplink resource type (or uplink subframe set), which has reached the maximum UE transmission power value (i.e., $P_{CMAX,c}(i)$). Conversely, settings may be made so that the uplink data channel (PUSCH) transmission power can accumulate/apply the corresponding Closed-loop parameter or transmission power control command having the positive value with respect to the uplink resource type (or uplink subframe set), which has not reached the maximum UE transmission power value (i.e., $P_{CMAX,c}(i)$).

Therefore, as shown in FIG. 7, although accumulation is not performed on the transmission power control command (TPC command) with respect to the static subframe set, which has reached the maximum transmission power value, accumulation may be performed on the transmission power control command (TPC command) with respect to the flexible subframe set, which has not reached the maximum transmission power value.

Second Embodiment

A case, when the results on whether or not a maximum UE transmission power value (i.e., $P_{CMAX,c}(i)$) of the uplink data channel (PUSCH) transmission power is reached are different from one another for each of the uplink resource types (or uplink subframe sets) at a specific subframe time point (i.e., SF #i), (e.g., a case, when uplink data channel (PUSCH) transmission powers related to some of the uplink subframe sets at the specific subframe time point (i.e., SF #i) have reached the maximum UE transmission power value, and when uplink data channel (PUSCH) transmission powers related to the remaining (or other) uplink subframe sets have not reached the maximum UE transmission power value will be described according to a second embodiment of the present invention.

Figure 8:
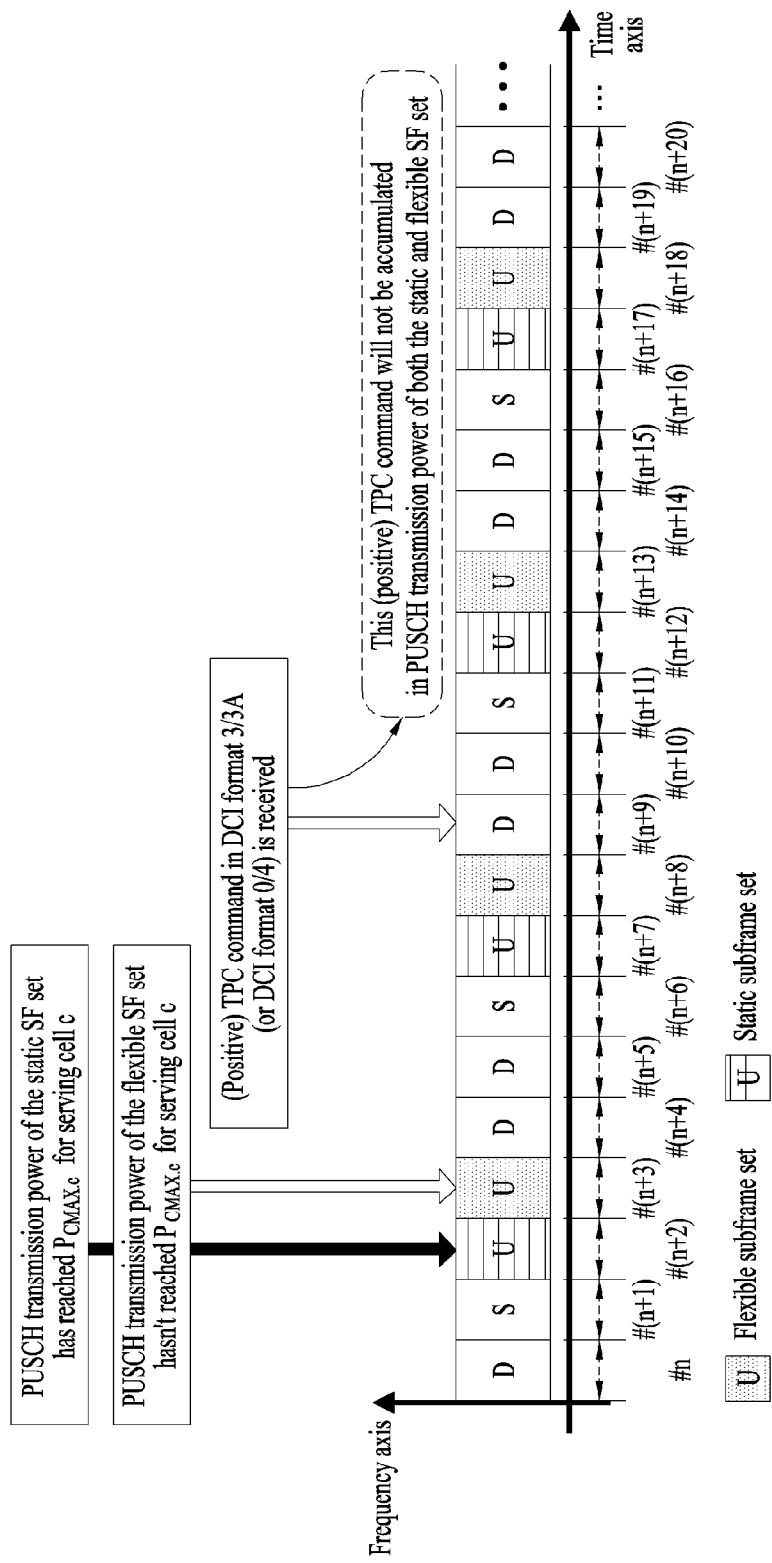

FIG. 8 illustrates a referential view of a second embodiment of the present invention. Referring to FIG. 8, in case the Closed-loop parameters or transmission power control commands (i.e., $f_c(k)$) having positive values are received later on, at a time point including the specific subframe time point (i.e., SF #i) (or at a time point not including the specific subframe time point (i.e., SF #i)), settings may be made so that the corresponding Closed-loop parameter or transmission power control command having the positive value is not accumulated/applied to all uplink resource types (or uplink subframe sets).

More specifically, in case the results on whether or not a maximum UE transmission power value (i.e., $P_{CMAX,c}(i)$) of the uplink data channel (PUSCH) transmission power is reached are different from one another for each of the uplink resource types (or uplink subframe sets) at a specific subframe time point (i.e., SF #i), the second embodiment of the present invention may be interpreted as an operation that does not accumulate/apply the Closed-loop parameter or transmission power control command (i.e., $f_c(k)$) having a positive value, which is received later on at a time point including the specific subframe time point (i.e., SF #i) (or at a time point not including the specific subframe time point (i.e., SF #i)), to all of the uplink resource types (or uplink subframe sets).

In this case, settings may be made so that the Closed-loop parameter or transmission power control command (i.e., $f_c(k)$) having a positive value, which is received later on at a time point including the specific subframe time point (i.e., SF #i) (or at a time point not including the specific subframe time point (i.e., SF #i)) is accumulated/applied to each of the uplink resource types (or uplink subframe sets), only in a case when the uplink data channel (PUSCH) transmission powers of all uplink resource types (or uplink subframe sets) at the specific subframe time point (i.e., SF #i) have not reached the maximum UE transmission power value (i.e., $P_{CMAX,c}(i)$).

Additionally, in case the uplink data channel (PUSCH) transmission powers of all uplink resource types (or uplink subframe sets) at the specific subframe time point (i.e., SF #i) have reached the maximum UE transmission power value (i.e., $P_{CMAX,c}(i)$), settings may be made so that the Closed-loop parameter or transmission power control command (i.e., $f_c(k)$) having a positive value, which is received later on at a time point including the specific subframe time point (i.e., SF #i) (or at a time point not including the specific subframe time point (i.e., SF #i)) is not accumulated/applied to each of the uplink resource types (or uplink subframe sets).

Accordingly, as shown in FIG. 8, even in a case when the PUSCH transmission power does not reach the maximum UE transmission power value (i.e., $P_{CMAX,c}(i)$) with respect to the flexible subframe set, whereas the PUSCH transmission power reaches the maximum UE transmission power value (i.e., $P_{CMAX,c}(i)$) with respect to the static subframe set, the transmission power control command (TPC command) may not be applied with respect to any of the static subframe set and the flexible subframe set.

Third Embodiment

According to a third embodiment of the present invention, settings may be made so that the Closed-loop parameter or transmission power control command (i.e., $f_c(k)$) having a positive value, which is received later on at a time point including the specific subframe time point (i.e., SF #i) (or at a time point not including the specific subframe time point (i.e., SF #i)) is accumulated/applied to all of the uplink resource types (or uplink subframe sets), only in a case when the uplink data channel (PUSCH) transmission powers of all uplink resource types (or uplink subframe sets) at the specific subframe time point (i.e., SF #i) have reached the maximum UE transmission power value (i.e., $P_{CMAX,c}(i)$).

According to the third embodiment of the present invention, in case the uplink data channel (PUSCH) transmission powers of all of the uplink resource types (or uplink subframe sets) do not simultaneously reach the maximum UE transmission power value (i.e., $P_{CMAX,c}(i)$) at the specific subframe time point (i.e., SF #i), it may be interpreted that the Closed-loop parameter or transmission power control command (i.e., $f_c(k)$) having a positive value, which is received later on at a time point including the specific subframe time point (i.e., SF #i) (or at a time point not including the specific subframe time point (i.e., SF #i)), is accumulated/applied to each of the uplink resource types (or uplink subframe sets).

For example, a case, when the uplink data channel (PUSCH) transmission powers of all of the uplink resource types (or uplink subframe sets) do not simultaneously reach the maximum UE transmission power value (i.e., $P_{CMAX,c}(i)$) at the specific subframe time point (i.e., SF #i), may be assumed herein. In this case, even if the uplink data channel (PUSCH) transmission powers related to some of the uplink resource types (or uplink subframe sets) have reached the maximum UE transmission power value, accumulation (i.e., $f_c(i)=f_c(i-1)+\delta_{PUSCH,c}(i-K_{PUSCH})$) may be performed on the corresponding Closed-loop parameter or transmission power control (TPC) command having a positive value. Additionally, if a Closed-loop parameter or transmission power control (TPC) command having a negative value is received later on (or afterwards), this may decrease the corresponding accumulated value. Moreover, as opposed to this, even if the accumulated power value exceeds the maximum UE transmission power value, the actual uplink data channel (PUSCH) transmission power that is finally transmitted by the user equipment may be limited to the maximum UE transmission power (i.e., $P_{CMAX,c}(i)$).

Fourth Embodiment

According to a fourth embodiment of the present invention, settings may be made so that the Closed-loop parameter or transmission power control (TPC) command (e.g., $f_c(k)$) having a positive value, which is received later on at a time point including the specific subframe time point (i.e., SF #i) (or at a time point not including the specific subframe time point (i.e., SF #i)), is not accumulated/applied to all of the uplink resource types or all of the uplink subframe sets, only in a case when the uplink data channel (PUSCH) transmission power of a representative/specific uplink resource type or representative/specific uplink subframe set, which is designated in advance, has reached the maximum UE transmission power value (i.e., $P_{CMAX,c}(i)$) at a specific subframe time point (i.e., SF #i).

According to the fourth embodiment of the present invention, the pre-designated representative/specific uplink resource type or representative/specific uplink subframe set may be defined as i) a subframe set including a static uplink subframe, or ii) a subframe set including a flexible uplink subframe, iii) or a subframe set not including a static uplink subframe, iv) or a subframe set not including a flexible uplink subframe, v) or a set having a lowest index or a highest index among the uplink subframe sets (or uplink resource types), vi) or a first set or a last set among the uplink subframe sets (or uplink resource types).

In case the uplink data channel (PUSCH) transmission power of a representative/specific uplink resource type or representative/specific uplink subframe set, which is designated in advance, has not reached the maximum UE transmission power value (i.e., $P_{CMAX,c}(i)$) at a specific subframe time point (i.e., SF #i), the fourth embodiment of the present invention may be interpreted that the Closed-loop parameter or transmission power control (TPC) command (e.g., $f_c(k)$) having a positive value, which is received later on at a time point including the specific subframe time point (i.e., SF #i) (or at a time point not including the specific subframe time point (i.e., SF #i)), is accumulated/applied to each of the uplink resource types or each of the uplink subframe sets.

For example, in case the uplink data channel (PUSCH) transmission power of a representative/specific uplink resource type or representative/specific uplink subframe set, which is designated in advance, has not reached the maximum UE transmission power value (i.e., $P_{CMAX,c}(i)$) at a specific subframe time point (i.e., SF #i), even if the uplink data channel (PUSCH) transmission powers related to some of the uplink resource types (or uplink subframe sets) have reached the maximum UE transmission power value, the corresponding Closed-loop parameter or transmission power control (TPC) command having a positive value may be accumulated (i.e., $f_c(i)=f_c(i-1)+\delta_{PUSCH,c}(i-K_{PUSCH})$). Additionally, if a Closed-loop parameter or transmission power control (TPC) command having a negative value is received later on (or afterwards), this may reduce the corresponding accumulated value.

Moreover, as opposed to this, even if the accumulated power value exceeds the maximum UE transmission power value, the actual uplink data channel (PUSCH) transmission power that is finally transmitted by the user equipment may be limited to the maximum UE transmission power (i.e., $P_{CMAX,c}(i)$).

In the description provided above, the embodiments of the present invention are described based upon the ambiguity in the Closed-loop parameter having a positive value. Hereinafter, a solution according to the present invention will be described based upon a case when ambiguity occurs, wherein the ambiguity relates to how to process Closed-loop parameters or transmission power control commands having negative values that are received later on at a time point including the specific subframe time point (i.e., SF #1) (or at a time point not including the specific subframe time point (i.e., SF #i)), in case only the Open-Loop Control Parameter is independently separated and the Closed-Loop Control Parameter is commonly applied between each of the different types of uplink resources (or each of the different types of uplink subframe sets), and when results on whether or not a minimum UE transmission power value of the uplink data channel (PUSCH) transmission power is reached are different from one another for each of the uplink resource types (or uplink subframe sets) at a specific subframe time point (i.e., SF #i).

Fifth Embodiment

According to a fifth embodiment of the present invention, in case results on whether or not a minimum UE transmission power value of the uplink data channel (PUSCH) transmission power is reached are different from one another for each of the uplink resource types (or uplink subframe sets) at a specific subframe time point (i.e., SF #i), if a Closed-loop parameter (or a transmission power control command (e.g., fc(k)) having a negative value is received later on at a time point including the specific subframe time point (i.e., SF #i) (or at a time point not including the specific subframe time point (i.e., SF #i)), settings may first be made so that the corresponding Closed-loop parameter or transmission power control command having a negative value is not accumulated/applied to the uplink resource type (or uplink subframe set) corresponding to the uplink data channel (PUSCH) transmission power that has reached the minimum UE transmission power value. Conversely, settings may also be made so that the corresponding Closed-loop parameter or transmission power control command having a negative value is accumulated/applied to the uplink resource type (or uplink subframe set) corresponding to the uplink data channel (PUSCH) transmission power that has not reached the minimum UE transmission power value.

Sixth Embodiment

In a sixth embodiment of the present invention, a case, when results on whether or not a minimum UE transmission power value of the uplink data channel (PUSCH) transmission power is reached are different from one another for each of the uplink resource types (or uplink subframe sets) at a specific subframe time point (i.e., SF #1), will be assumed. For example, a case, when uplink data channel (PUSCH) transmission powers related to some of the uplink subframe sets reach the minimum UE transmission power value at specific subframe time point (i.e., SF #i), and a case, when uplink data channel (PUSCH) transmission powers related to the remaining/other uplink subframe sets do not reach the minimum UE transmission power value, may be assumed.

In this case, if a Closed-loop parameter or a transmission power control command (e.g., $f_c(k)$) having a negative value is received later on at a time point including the specific subframe time point (i.e., SF #i) (or at a time point not including the specific subframe time point (i.e., SF #i)), settings may be made so that the corresponding Closed-loop parameter or transmission power control command having a negative value is not accumulated/applied to all of the uplink resource types (or uplink subframe sets).

More specifically, in case results on whether or not a minimum UE transmission power value of the uplink data channel (PUSCH) transmission power is reached are different from one another for each of the uplink resource types (or uplink subframe sets) at a specific subframe time point (i.e., SF #i), the sixth embodiment of the present invention may be interpreted as an operation that does not accumulate/apply the Closed-loop parameter or (transmission power control command (e.g., $f_c(k)$) having a negative value, which is received later on at a time point including the specific subframe time point (i.e., SF #i) (or at a time point not including the specific subframe time point (i.e., SF #i)), to all of the uplink resource types (or uplink subframe sets).

Additionally, in case this embodiment is applied, settings may be made so that the Closed-loop parameter or transmission power control command (e.g., $f_c(k)$) having a negative value, which is received later on at a time point including the specific subframe time point (i.e., SF #i) (or at a time point not including the specific subframe time point (i.e., SF #i)), is accumulated/applied to each of the uplink resource types (or uplink subframe sets), only when the uplink data channel (PUSCH) transmission powers of all of the uplink resource types (or uplink subframe sets) at the specific subframe time point (i.e., SF #i) do not reach the minimum UE transmission power value.

Alternatively, in case this embodiment is applied, settings may be made so that the Closed-loop parameter or transmission power control command (e.g., $f_c(k)$) having a negative value, which is received later on at a time point including the specific subframe time point (i.e., SF #i) (or at a time point not including the specific subframe time point (i.e., SF #i)), is not accumulated/applied to all of the uplink resource types (or uplink subframe sets), when the uplink data channel (PUSCH) transmission powers of all of the uplink resource types (or uplink subframe sets) at the specific subframe time point (i.e., SF #i) have reached the minimum UE transmission power value.

Seventh Embodiment

According to a seventh embodiment of the present invention, settings may be made so that the Closed-loop parameter or transmission power control command (e.g., $f_c(k)$) having a negative value, which is received later on at a time point including the specific subframe time point (i.e., SF #i) (or at a time point not including the specific subframe time point (i.e., SF #i)), is not accumulated/applied to all of the uplink resource types (or uplink subframe sets), only in the case when the uplink data channel (PUSCH) transmission powers of all of the uplink resource types (or uplink subframe sets) at the specific subframe time point (i.e., SF #i) have reached the minimum UE transmission power value.

In an eighth embodiment of the present invention, in case the uplink data channel (PUSCH) transmission powers of all of the uplink resource types (or uplink subframe sets) have not reached the minimum UE transmission power value (at the same time) at the specific subframe time point (i.e., SF #i), it may be interpreted that the Closed-loop parameter or transmission power control command (e.g., $f_c(k)$) having a negative value, which is received later on at a time point including the specific subframe time point (i.e., SF #i) (or at a time point not including the specific subframe time point (i.e., SF #i)), is accumulated/applied to each of the uplink resource types (or uplink subframe sets).

For example, in case the uplink data channel (PUSCH) transmission powers of all of the uplink resource types (or uplink subframe sets) have not reached the minimum UE transmission power value (at the same time) at the specific subframe time point (i.e., SF #i), even if the uplink data channel (PUSCH) transmission powers related to some of the uplink resource types (or uplink subframe sets) have reached the minimum UE transmission power value, the corresponding Closed-loop parameter or transmission power control command having the negative value may be accumulated (i.e., $f_c(i)=f_c(i-1)+\delta_{PUSCH,c}(i-K_{PUSCH})$). Additionally, if a Closed-loop parameter or transmission power control command having a positive value is received later on (or afterwards), this may increase the corresponding accumulated value.

Eighth Embodiment

According to an eighth embodiment of the present invention, settings may be made so that the Closed-loop parameter or transmission power control (TPC) command (e.g., $f_c(k)$) having a negative value, which is received later on at a time point including the specific subframe time point (i.e., SF #i) (or at a time point not including the specific subframe time point (i.e., SF #i)), is not accumulated/applied to all of the uplink resource types or all of the uplink subframe sets, only in a case when the uplink data channel (PUSCH) transmission power of a representative/specific uplink resource type (or representative/specific uplink subframe set), which is designated in advance, has reached the minimum UE transmission power value at a specific subframe time point (i.e., SF #i).

For example, the pre-designated representative/specific uplink resource type or representative/specific uplink subframe set may be defined as i) a subframe set including a static uplink subframe, or ii) a subframe set including a flexible uplink subframe, iii) or a subframe set not including a static uplink subframe, iv) or a subframe set not including a flexible uplink subframe, v) or a set having a lowest index or a highest index among the uplink subframe sets (or uplink resource types), vi) or a first set or a last set among the uplink subframe sets (or uplink resource types).

Additionally, in case the uplink data channel (PUSCH) transmission power of a representative/specific uplink resource type (or representative/specific uplink subframe set), which is designated in advance, has not reached the minimum (UE) transmission power value at a specific subframe time point (i.e., SF #i), the eighth embodiment of the present invention may be interpreted that the Closed-loop parameter or transmission power control (TPC) command (e.g., $f_c(k)$) having a negative value, which is received later on at a time point including the specific subframe time point (i.e., SF #i) (or at a time point not including the specific subframe time point (i.e., SF #i)), is accumulated/applied to each of the uplink resource types or each of the uplink subframe sets.

For example, in case the uplink data channel (PUSCH) transmission power of a representative/specific uplink resource type (or representative/specific uplink subframe set), which is designated in advance, has not reached the minimum (UE) transmission power value at a specific subframe time point (i.e., SF #i), even if the uplink data channel (PUSCH) transmission powers related to some of the uplink resource types (or uplink subframe sets) have reached the minimum UE transmission power value, the corresponding Closed-loop parameter or transmission power control (TPC) command having the negative value may be accumulated (i.e., $f_c(i)=f_c(i-1)+\delta_{PUSCH,c}(i-K_{PUSCH})$). Additionally, if a Closed-loop parameter or transmission power control (TPC) command having a positive value is received later on (or afterwards), this may increase the corresponding accumulated value.

The above-described exemplary embodiments of the present invention shall also be interpreted as an aspect of the present invention, and, therefore, it will be apparent that the above-described exemplary embodiments of the present invention may be considered as proposed solutions. Additionally, although each of the above-described proposed methods/exemplary embodiments may be independently realized, some of the above-described proposed methods/exemplary embodiments may also be realized in a combined (or integrated) form (or structure).

Additionally, the exemplary embodiments/proposed methods of the present invention may also be extendedly applied in order to resolve the problem of ambiguity, wherein the ambiguity relates to how to process Closed-loop parameters or transmission power control commands (e.g., $f_c(k)$, $g(i)$) having positive or negative values, which are received later on at a time point including the specific subframe time point (i.e., SF #i), for each subframe set, and wherein, in case only the Open-Loop Control Parameter is independently separated and the Closed-Loop Control Parameter is commonly applied between each of the different types of uplink resources (or each of the different types of uplink subframe sets), the ambiguity occurs i) if results on whether or not a maximum UE transmission power value (i.e., $P_{CMAX,c}(i)$) (or minimum transmission power value) of an uplink control channel (PUCCH) or SRS (Sounding Reference Signal) transmission power is reached, ii) or if results on whether or not a minimum UE transmission power value of an uplink control channel (PUCCH) or SRS (Sounding Reference Signal) transmission power is reached are different from one another for each of the uplink resource types (or uplink subframe sets) at a specific subframe time point (i.e., SF #i).

Additionally, the above-described exemplary embodiments of the present invention may be configured to be restrictedly applied only to a case when the dynamic change mode of the radio resource use is set (e.g., when the base station has set up a dynamic change mode of the radio resource to the user equipment through a pre-defined (or pre-determined) signal). Moreover, the above-described exemplary embodiments of the present invention may also be configured to be restrictedly applied only to a cell, which has its configuration set to a dynamic change mode of the radio resource use and/or a Subframeset-dependent UL Power Control mode.

Additionally, the above-described proposed methods may be i) configured to be restrictedly applied only to a case when an Accumulative TPC command of a Closed-Loop parameter that has received an "Accumulation-enabled" parameter (corresponding to a parameter associated with an upper-layer (or higher layer) signal) or a transmission power control command (e.g., $f_c(i)$) is designated, ii) or configured to be restrictedly applied only to a case when an Absolute TPC command of a Closed-Loop parameter that has received an "Accumulation-enabled" parameter or a transmission power control command (e.g., $f_c(i)$) is designated, iii) or configured to be restrictedly applied only to a case when Closed-Loop parameter or a transmission power control command is received through a specific DCI format (e.g., DCI Format 0/4 or DCI Format 3/3A), iv) or configured to be restrictedly applied only to a case when a synchronous transmission mode of the PUSCH and PUCCH is set up, v) or configured to be restrictedly applied only to a case when a synchronous transmission mode of the PUSCH and PUCCH is not set up, vi) or configured to be restrictedly applied only in a PCell or a SCell, vii) or configured to be restrictedly applied only in a specific cell (or Component Carrier (CC)) being set to the dynamic change mode of the radio resource use.

Furthermore, settings may be made so that information on whether or not to apply the exemplary embodiments/proposed methods of the present invention, or information on the rules/configurations of the above-described proposed methods are notified to the user equipment by the base station through a pre-defined signal (e.g., physical layer signal or upper layer signal).

Figure 9:
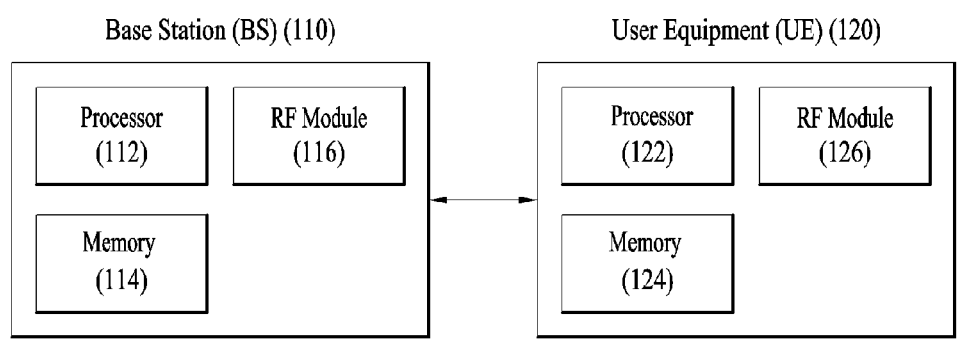
FIG. 9 illustrates a base station and a user equipment that can be applied to an exemplary embodiment of the present invention.

FIG. 9 illustrates a base station and a user equipment that can be applied to an exemplary embodiment of the present invention.

In case a relay is included in a wireless communication system, in a backhaul link, communication is established between the base station and the relay, and, in an access link, communication is established between the relay and the user equipment. Therefore, the base station or the user equipment, which are presented as examples in the drawing, may be replaced with the relay in accordance with the corresponding circumstances.

Referring to FIG. 9, a wireless communication device includes a base station (BS, 110) and a user equipment (UE, 120). The base station (110) includes a processor (112), a memory (114), and a Radio Frequency (RF) unit (116). The processor (112) may be configured to realize the procedures and/or methods, which are proposed in the present invention. The memory (114) is connected to the processor (112) and stores diverse information related to the operations of the processor (112). The RF unit (116) is connected to the processor (112) and transmits and/or receives radio signals. The user equipment (120) includes a processor (122), a memory (124), and a RF unit (126). The processor (122) may be configured to realize the procedures and/or methods, which are proposed in the present invention. The memory (124) is connected to the processor (122) and stores diverse information related to the operations of the processor (122). The RF unit (126) is connected to the processor (122) and transmits and/or receives radio signals. The base station (110) and/or the user equipment (120) may have a single antenna or multiple antennae.

The embodiments of the present invention described hereinabove are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof. In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor.

The memory unit may be located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

What is claimed is:

1. A method for controlling transmission power of a user equipment (UE) in a wireless communication system supporting dynamic changes of a use of radio resources, the method comprising:

receiving, from a base station, a transmission power control (TPC) command including a first closed-loop control parameter applied to uplink signals of a first radio resource set and a second radio resource set, wherein the first radio resource set is configured to allow the dynamic changes, and
wherein the second radio resource set is configured to prevent the dynamic changes;
increasing uplink transmission power values for the first radio resource set and the second radio resource set by the first closed-loop control parameter when the first closed-loop control parameter corresponds to a positive value;
transmitting, to the base station, the uplink signals using accumulated uplink transmission power values if accumulated uplink transmission power values are not larger than a maximum value, or using the accumulated uplink transmission power values limited to the maximum value if at least one of the accumulated uplink transmission power values is larger than the maximum value; and
decreasing the accumulated uplink transmission power values by a second closed-loop control parameter when the second closed-loop control parameter corresponds to a negative value and at least one of the accumulated uplink transmission power values is larger than the maximum value.

2. The method of claim 1, further comprising:
decreasing uplink transmission power values for the first radio resource set and the second radio resource set by the first closed-loop control parameter when the first closed-loop control parameter corresponds to the negative value;
transmitting, to the base station, the uplink signals using the accumulated uplink transmission power values if the accumulated uplink transmission power values are not smaller than a minimum value, or using the accumulated uplink transmission power values limited to the minimum value if at least one of the accumulated uplink transmission power values is smaller than the minimum value; and
increasing the accumulated uplink transmission power values by the second closed-loop control parameter when the second closed-loop control parameter corresponds to the positive value and at least one of the accumulated uplink transmission power values is smaller than the minimum value.

3. The method of claim 2, wherein the first closed-loop control parameter corresponds to the negative value and is accumulated to the uplink transmission power values, when both of the uplink data channel transmission power values for the first radio resource set and the second radio resource set are larger than the minimum value.

4. The method of claim 2, wherein the first closed-loop control parameter corresponds to the negative value and is not applied to both of the uplink transmission power values for the first radio resource set and the second radio resource set, when both of the uplink data channel transmission power values for the first radio resource set and the second radio resource set are equal to or smaller than the minimum value.

5. The method of claim 1, wherein the first closed-loop control parameter corresponds to the positive value and is accumulated to both of the uplink transmission power values for the first radio resource set and the second radio resource set, when both of the uplink data channel transmission power values for the first radio resource set and the second radio resource set are smaller than the maximum value.

6. The method of claim 1, wherein the first closed-loop control parameter corresponds to the positive value and is not accumulated to both of the uplink transmission power values for the first radio resource set and the second radio resource set, when both of the uplink transmission power values for the first radio resource set and the second radio resource set are equal to or larger than the maximum value.

7. A user equipment for performing transmission power control in a wireless communication system supporting dynamic changes of a use of radio resources, the user equipment comprising:
a Radio Frequency (RF) unit; and
a processor,
wherein the processor is configured to:
control the RF unit to receive, from a base station, a transmission power control (TPC) command including a first closed-loop control parameter applied to uplink signals of a first radio resource set and a second radio resource set,
wherein the first radio resource set is configured to allow the dynamic changes, and
wherein the second radio resource set is configured to prevent the dynamic changes,
increase uplink transmission power values for the first radio resource set and the second radio resource set by the first closed-loop control parameter when the first closed-loop control parameter corresponds to a positive value,
control the RF unit to transmit, to the base station, the uplink signals using accumulated uplink transmission power values if the accumulated uplink transmission power values are not larger than a maximum value, or using the accumulated uplink transmission power values limited to the maximum value if at least one of the accumulated uplink transmission power values is larger than the maximum value, and
decrease the accumulated uplink transmission power values by a second closed-loop control parameter when the second closed-loop control parameter corresponds to a negative value and at least one of the accumulated uplink transmission power values is larger than the maximum value.

8. The user equipment of claim 7, wherein the processor is further configured to:
decrease uplink transmission power values for the first radio resource set and the second radio resource set by the first closed-loop control parameter when the first closed-loop control parameter corresponds to a negative value,
control the RF unit to transmit, to the base station, the uplink signals using the accumulated uplink transmission power values if the accumulated uplink transmission power values are not smaller than a minimum value, or using the accumulated uplink transmission power values limited to the minimum value if at least one of the accumulated uplink transmission power values is smaller than the minimum value, and
increase the accumulated uplink transmission power values by the second closed-loop control parameter when the second closed-loop control parameter corresponds to the positive value and at least one of the accumulated uplink transmission power values is smaller than the minimum value.

9. The user equipment of claim 8, wherein the first closed-loop control parameter corresponds to the negative value and is not applied to both of the uplink transmission power values for the first radio resource set and the second radio resource set, when both of the uplink data channel transmission power values for the first radio resource set and the second radio resource set are equal to or smaller than the minimum value.

10. The user equipment of claim 8, wherein the first closed-loop control parameter corresponds to the negative value and is accumulated to the uplink transmission power values, when both of the uplink data channel transmission power values for the first radio resource set and the second radio resource set are larger than the minimum value.

11. The user equipment of claim 7, wherein the first closed-loop control parameter corresponds to the positive value and is accumulated to both of the uplink transmission power values for the first radio resource set and the second radio resource set, when both of the uplink transmission power values for the first radio resource set and the second radio resource set are smaller than the maximum value.

12. The user equipment of claim 7, wherein the first closed-loop control parameter corresponds to the positive value and is not accumulated to both of the uplink transmission power values for the first radio resource set and the second radio resource set, when both of the uplink transmission power values for the first radio resource set and the second radio resource set are equal to or larger than the maximum value.

* * * * *